(12) United States Patent
Thrun

(10) Patent No.: US 9,361,943 B2
(45) Date of Patent: Jun. 7, 2016

(54) SYSTEM AND METHOD FOR TAGGING OBJECTS IN A PANORAMIC VIDEO AND ASSOCIATING FUNCTIONS AND INDEXING PANORAMIC IMAGES WITH SAME

(75) Inventor: Sebastian Thrun, Stanford, CA (US)

(73) Assignee: The Board of Trustees of the Leland Stanford Jr. University, Stanford, CA (US)

( * ) Notice: Subject to any disclaimer, the term of this patent is extended or adjusted under 35 U.S.C. 154(b) by 1823 days.

(21) Appl. No.: 11/837,276

(22) Filed: Aug. 10, 2007

(65) Prior Publication Data

US 2008/0106594 A1 May 8, 2008

Related U.S. Application Data

(60) Provisional application No. 60/864,764, filed on Nov. 7, 2006.

(51) Int. Cl.

| | |
|---|---|
| *G06F 13/00* | (2006.01) |
| *G11B 27/34* | (2006.01) |
| *G06F 17/30* | (2006.01) |
| *G06T 19/00* | (2011.01) |
| *G11B 27/32* | (2006.01) |
| *H04N 5/85* | (2006.01) |

(52) U.S. Cl.
CPC .......... *G11B 27/34* (2013.01); *G06F 17/30817* (2013.01); *G06F 17/30855* (2013.01); *G06T 19/003* (2013.01); *G11B 27/329* (2013.01); *H04N 5/85* (2013.01)

(58) Field of Classification Search
CPC ............. G06F 17/30817; G06F 17/30855; G06T 19/003; G11B 27/24; G11B 27/329; H04N 5/85; H04N 7/181; H04N 13/0055; H04N 13/0497; H04N 13/044; H04N 13/0475

USPC ................................................ 348/39; 725/88
See application file for complete search history.

(56) References Cited

U.S. PATENT DOCUMENTS

| | | | |
|---|---|---|---|
| 5,987,164 | A | 11/1999 | Szeliski et al. |
| 6,118,474 | A | 9/2000 | Nayar |
| 6,711,293 | B1 | 3/2004 | Lowe |

(Continued)

OTHER PUBLICATIONS

Kimber et al.; "FlyAbout: Spatially Indexed Panoramic Video," Video Proceedings fo ACM Multimedia 2001; Ottawa, CA; Oct. 2001.

(Continued)

*Primary Examiner* — Robert B Harrell
(74) *Attorney, Agent, or Firm* — KPPB LLP

(57) ABSTRACT

A system and process for attaching tags to panoramic video. Tags provide information when viewing panoramic images, serve as references to specific actions and serve as reference for outside systems into a panoramic image database. Objects in a video can be tagged. It defines tags through 4-D time-space curves, which specify the 3-D location of a tagged object over time. It provides a user-friendly mechanism for defining said curves in panoramic video, which rely on curve fitting techniques to minimize the number of images to be labeled. It provides a mechanism for annotating tags with further information. When displaying tagged panoramic video, tags are graphically superimposed on the panoramic video feed using projective projection techniques. From this visualization, a user can then select a given tag and invoke an associated action. Additionally a mechanism whereby tags and associated user-provided information are used as index into panoramic image databases is provided.

9 Claims, 4 Drawing Sheets

(56) References Cited

U.S. PATENT DOCUMENTS

| | | | |
|---|---|---|---|
| 6,788,333 | B1 | 9/2004 | Uyttendaele et al. |
| 6,895,126 | B2 | 5/2005 | Di Bernardo et al. |
| 6,924,832 | B1 | 8/2005 | Shiffer et al. |
| 6,968,973 | B2 | 11/2005 | Uyttendaele et al. |
| 7,096,428 | B2 | 8/2006 | Foote et al. |
| 7,239,760 | B2 | 7/2007 | Di Bernardo et al. |
| 7,577,316 | B2 | 8/2009 | Di Bernardo et al. |
| 7,805,025 | B2 | 9/2010 | Goncalves et al. |
| 7,813,596 | B2 | 10/2010 | Di Bernardo et al. |
| 8,213,749 | B2 | 7/2012 | Di Bernardo et al. |
| 8,818,138 | B2 | 8/2014 | Di Bernardo et al. |
| 2006/0117356 | A1* | 6/2006 | Jojic et al. ........................ 725/88 |

OTHER PUBLICATIONS

Lowe; "Object Recognition from Local Scale-Invariant Features;" Proceedings of the International Conference on Computer Vision; ICVPR '99.

Horn et al.; "Determining Optical Flow;" Artificial Intelligence; vol. 17; pp. 185-203; 1981.

Lippman; "Movie-Maps: An Application of the Optical Videodisc to Computer Graphics;" SIGGRAPH '80; vol. 14(3); Jul. 1980; pp. 32-42.

Svoboda et al.; "Epipolar Geometry for Panoramic Cameras;" Lecture Notes in Computer Science; vol. 1406; pp. 218-231; 1998.

Isard et al.; "Condensation—Donditional Density Propagation for Visual Tracking;" International Journal of Computer Vision; vol. 29(1); pp. 5-28; 1998.

Hastie et al.; "The Elements of Statistical Learning: Data Mining, Inference, and Prediction;" (c) 2001.

Broida et al.; "Recursive 3-d Motion Estimation from a Monocular Image Sequence;" IEEE Transactions on Aerospace and Electronic Systems; vol. 26(4); Jul. 1990.

Corke et al.; Omidirectional Visual Odometry for a Planetary Rover; Proceedings of 2004 IEEE/RSJ International Conference on Intelligent Robots and Systems; pp. 4007-4012; Sep. 28-Oct. 2, 2004.

* cited by examiner

SYSTEM AND METHOD FOR TAGGING OBJECTS IN A PANORAMIC VIDEO AND ASSOCIATING FUNCTIONS AND INDEXING PANORAMIC IMAGES WITH SAME

CROSS REFERENCE TO RELATED APPLICATIONS

This application claims the benefit under 35 U.S.C. §119 (e) of U.S. Provisional Patent Application Ser. No. 60/864, 764, entitled "System and Method for Tagging Objects in Panoramic Video and Associating Functions and Indexing Panoramic Images with Same" by Sebastian Thrun, filed Nov. 7, 2006, which is hereby incorporated by reference.

BACKGROUND OF THE INVENTION

1. Field of the Invention

The invention is related to video tours, and more particularly to interactive video tours exploring remote real-world locations.

2. Description of the Related Art

Beginning with the "Movie maps" project by Lippman (A. Lippman, "Movie maps: An application of the optical videodisc to computer graphics," Computer Graphics SIGGRAPH 1980, vol. 14 (3), July 1980, 32-43), there has been a series of systems for viewing video of remote locations. The Movie Maps project augmented images by virtual pointers to other information. By navigating towards a building in an image, for example, a user could select information attached to this building. More recent examples of virtual tour applications allow users to navigate panoramic video more seamlessly, giving users control over panning, tilting, zooming, and the direction of motion; see U.S. Pat. Nos. 6,968,973 and 7,096,428.

In 3-D video games, it is common to attach tags to objects in the scene that can be selected by users. For example, a tag may be a marked location on the surface of a rendered object, and by moving a cursor to this object the associated action may be invoked. These tags may also provide an alternative index into a virtual video game environment.

In virtual tour applications using panoramic images, providing such tags is difficult. This is because the true 3-D model of the imaged structure is generally unknown. Methods for recovering such structure generally require rich texture in the video stream, and only work well in stationary environments without moving objects. Further, existing image based 3-D reconstruction methods tend to be brittle in the presence of occlusion boundaries.

This motivates the creation of methods that facilitate the creation and display of tags in panoramic video, and the use of same within virtual tour applications.

SUMMARY OF THE INVENTION

Embodiments according to the present invention enable a user to define tags that label objects in panoramic images and video. Objects may be stationary in the 3-D world, or they may be moving. The embodiments enable a user to define the time-space coordinates of tagged objects in a user-friendly way, by manually labeling one or more panoramic images. They also enable a user to attach further information to a tag, such as textual information, images, or specific actions. Embodiments according to the present invention make it possible to visualize tags when viewing panoramic images and video. They enable a user to execute specific actions through selecting a tag. And finally, embodiments according to this invention make it possible to textually index a panoramic image database, by linking textual annotations to specific objects in the video stream.

BRIEF DESCRIPTION OF THE DRAWINGS AND FLOWCHARTS

The present invention will become more fully understood from the detailed description given below and the accompanying drawings. These descriptions and drawings are given for purposes of illustration only, and thus do not limit the present invention.

DETAILED DESCRIPTION OF THE INVENTION

Figure 1:
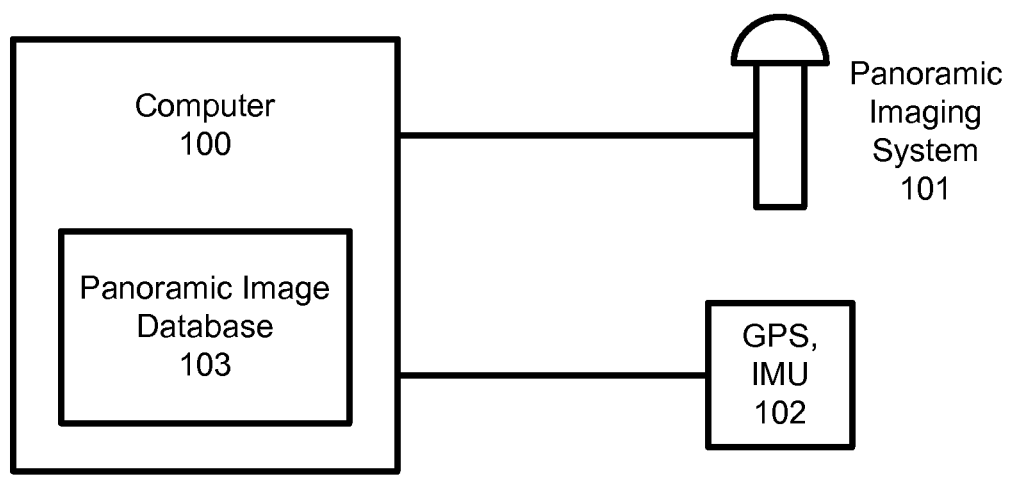
FIG. 1 is a block diagram of a system according to the present invention.

Referring now to FIG. 1, a system according to the according to the preferred embodiment of the present invention is shown. In the preferred embodiment of the invention disclosed herein, one or more sequences of panoramic images are acquired using a panoramic imaging sensor 101, illustrated in FIG. 1. A computer system 100 is connected to a panoramic imaging system 101 and a positioning system 102 such as GPS. A panoramic image database 103 is stored on the computer 100. Each image is annotated with the location at which the image is taken; where the location of each image will be expressed by three Cartesian coordinates. In the preferred embodiment, the location label is obtained through a positioning system 102, which is preferably comprised of a satellite GPS (global positioning system) and an IMU (inertial measurement unit). The invention also records the time t at which an image is recorded, and attaches a time stamp t to every image in the image database. All panoramic images annotated with their locations and time stamps together comprise the annotated image database 103. In the preferred embodiment, this database 103 is stored on a computer 100.

In the preferred embodiment, a "tag" is comprised of four pieces of information: a 4-D space time curve that defines the location of the tag in the physical world; a link to a specific action that is to be executed upon the selection of same by a user; a textual annotation that explains the meaning of the tag and serves as an index into the panoramic video; and a pointer to associated panoramic images.

In the preferred embodiment, the 4-D time-space curve is a polynomial of the form $$f(t) = \sum_0^N a(n) \cdot t^n$$

Here f(t) is a three-valued vector function which maps scalar time values t into 3-D coordinates in Cartesian space. Each a(n) is a three-valued coefficient vector that determines the shape of the time-space function. The integer N is the degree of the polynomial. In the most simple instance, N=0, and hence f(t) is a constant function that does not depend on t. Put differently, f(t) refers to a time-invariant location in 3-D space. For the more general case of N=1, the tagged object may move through 3-D space at a fixed velocity. In even more general embodiments with N>1, f(t) can be an arbitrary nonlinear function that varies with the time index t. Then f(t) describes a nonlinear time-space curve that maps any value of the time variable t into a specific 3-D location in space. In the preferred embodiment, the value of N is selected by the user.

Figure 2:
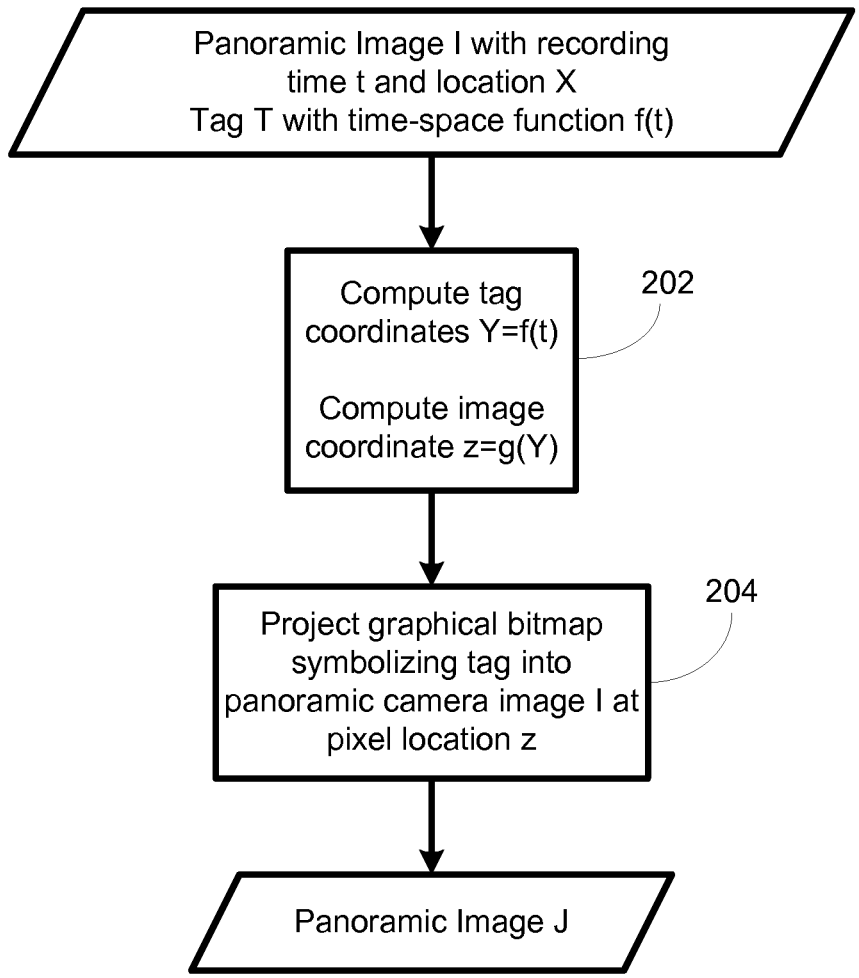
FIG. 2 is a flowchart of the tag rendering algorithm according to the present invention.

The preferred embodiment renders a tag graphically into the panoramic video. The rendering process is illustrated in the flowchart in FIG. 2. Given a specific panoramic image I, its recording location X, and its recording time t, the preferred embodiment first computes the 3-D value of the function f(t) that corresponds to the recording time t of the panoramic image in step 202. The result of this computation is a 3-D coordinate in space. In step 202 the preferred embodiment will also render the textual annotation of the tag, or an abbreviation thereof, in the panoramic image. The preferred embodiment then in step 204 projects this 3-D coordinate into the panoramic image, using common panoramic projective projection equations that are widely used in the field of computer vision; see for example Svoboda, T., Pajdla, T., and Hlavac, V., "Epipolar Geometry for Panoramic Cameras," Lecture Notes in Computer Science: 1406, pages 218-231, 1998.

Within this disclosure, the projective function will be denoted by the symbol g( ). Specific choices for go for different panoramic camera models are described in common textbooks and research papers on computer vision. In general, performing this projection requires calibration parameters of the camera. The specific bitmap rendered into the panoramic image to visualize a tag may vary depending on the application. It will be understood by those skilled in the art that the specific camera model, the bitmap used to visualize a tag, or the specific method for blending a tag bitmap with a panoramic image may vary without departing from the scope and spirit of the present invention.

The second component of a tag is one or more fields that specify the actions that shall be involved when a tag is selected by a user. Specifically, when viewing panoramic images, a user may employ a pointing device to select a tag, so as to execute the associated action. For example, she might use an electronic mouse, a track ball, or a touch-sensitive screen to move a computer cursor to the location of a tag in the image, and then use a mouse click to indicate her choice to select the tag. Those skilled in the art will recognize there exist many ways to select a tag within an image. This disclosure is intended to include any such method, and the list of selection methods provided herein is meant as illustrative, not limiting. When a tag has been selected, the associated action is executed.

This invention provides a system and process for the definition of a tag by a user. In particular, it provides an intuitive mechanism for the specification of the time-space curve f(t). This system and process enables a user to define the time-space curve f(t) through a small number of interactions with a computer system 100.

The mechanism for creating tags is based on labeling panoramic images. A user wishing to define a tag will indicate the location of the tag within a panoramic image. For example, the user may do so by moving a computer cursor to the location of an object of interest with the help of a pointing device. She might then use a mouse click to indicate the desired location of a tag within an image. The image selected by the user for tagging shall be denoted $I_0$; the associated recording time to; and the 2-D image coordinates selected by the user by $z_0$.

A single image coordinate $z_0$ is generally insufficient to specify the 3-D location $f(t_0)$ of the tag relative to this image. This is because a panoramic image is a 2-D projection g( ) of the 3-D world. The image location $z_0$ indicated by the user thus translates into a ray of possible object coordinates in the physical world, which are comprised of all 3-D locations that are solutions to the equation:

$$z_0 = g(f(t_0))$$

The degeneracy that image pixels correspond to entire rays of 3-D locations, is well known in the field of computer vision. In general terms, the user selection of $z_0$ only constrains the shape of the function f(t) such that $f(t_0)$, projected into the camera plane, must be identical or near the image location $z_0$ selected by the user. To recover the function f(t), additional information is thus required.

Embodiments according to this invention offer a number of mechanisms for filling in the missing information, so that a unique solution for the time-space function f(t) can be identified. The preferred embodiment uses two mechanisms for the recovery of the time-space function f(t).

Figure 3:
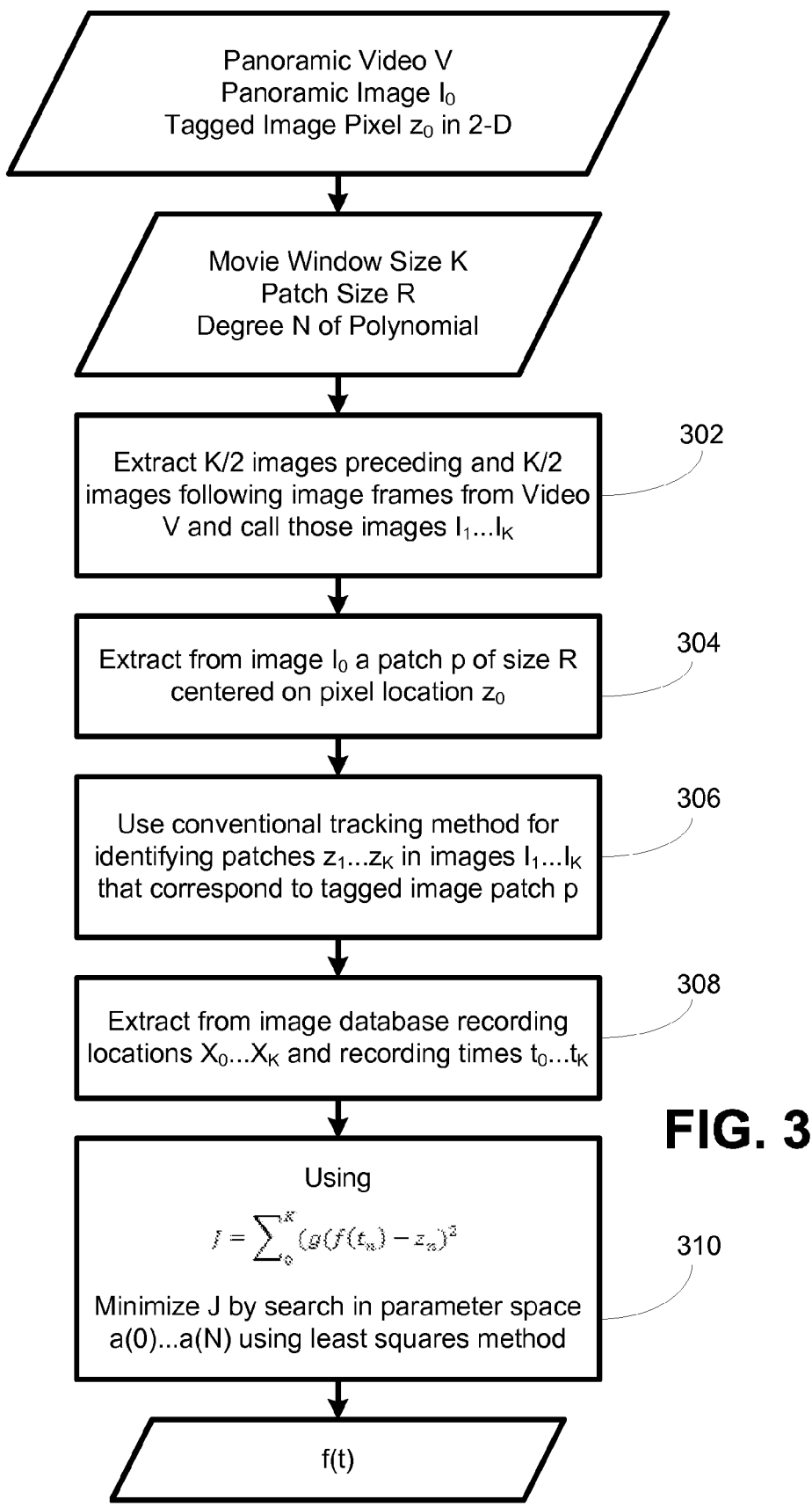
FIG. 3 is a flowchart of the algorithm for defining the time-space function of a tag with optical flow according to the present invention.

The first is illustrated in FIG. 3. This procedure applies an image-based tracking algorithm for tracking the image patch surrounding the region of interest in K other panoramic images. Here K is a fixed value, such as K=100. Those skilled in the art recognize that a rich literature exists on image-based tracking methods in the computer vision literature, which make it possible to track local image patches in video. For example, some embodiments may use a combination of SIFT features; see Lowe, D. G., "Object recognition from local scale-invariant features," Proceedings of the International Conference on Computer Vision (ICVPR'99), 1999; see also U.S. Pat. No. 6,711,293. For tracking a labeled image patch, such SIFT features may be combined with optical flow, as described in Horn, B. K. P, and Schunck, B. G., "Determining optic flow," Artificial Intelligence 1981; 17:185-203. By tracking same in adjacent panoramic video frames $I_1, I_2 \ldots I_K$, the 2-D locations $z_1, z_2 \ldots z_K$ of the object of interest is determined in said images.

In the example of FIG. 3, in step 302 the method extracts K/2 images preceding and K/2 images following image frames from Video V, and calls those images $I_1 \ldots I_K$. Then in step 304 the method extracts from image $I_0$ a patch p of size R centered on pixel location $z_0$. In step 306 a conventional tracking method is used to identify patches $z_1 \ldots z_K$ in images $I_1 \ldots I_K$ that correspond to tagged image patch p. Then in step 308 the method extracts from the image database the recording locations $X_0 \ldots X_K$ and the recording times $t_0 \ldots t_K$.

Each such image location $z_i$ for i=1 . . . K provides additional constraints on the parameters of the time-space function f(t). For the i-th image with recording time $t_i$ and image location $z_i$, this constraint is of the form $$g(f(t_i)) = z_i$$

Embodiments according to this invention provide a mechanism to identify the by function fitting, using these tracked image locations. In particular as shown in step 310, they determine the parameters a(0), a(1) . . . a(N) by selecting those values that minimize the squared error between the projection $g(f(t_i))$ of the time-space function $f(t_i)$ into each panoramic image, and the location label for the object of interest in each corresponding image $z_i$, for each applicable index i. They achieve this by minimizing the following quadratic function:

$$J = \sum_i (g(f(t_i)) - z_i)^2$$

Such a minimization is known in the literature as least squares optimization. Since the function f(t) varies with its parameters a(1) . . . a(N), the minimization finds suitable parameters and hence recovers the desired time-space function f(t). The preferred embodiment applies a conjugate gradient method to minimize J. Those skilled in the art realize that the optimization literature offers numerous alternative solutions to least squares problems.

In many situations, the problem of determining f(t) is well-defined so as long as the number of labeled image locations is no smaller than 1.5 times the value of N+1, where N is the degree of the polynomial used to represent the function f(t). This is because a time-space polynomial of degree N possesses 3(N+1) parameters; where as K image labels provide 2 K values. Degeneracies exist, and those are commonly detected by standard optimization methods.

In the special case where the object in the image is known to be stationary in its 3-D world coordinates, the appropriate polynomial will be of degree N=0. It then may suffice to label only two images, $I_0$ and $I_1$, since 2>=(0+1)*1.5=1.5. Graphically speaking, each such image defines a ray in 3-D space. The value of the parameter vector a(0) is then the location closest to those two rays, which is generally well defined unless these rays are parallel.

In the preferred embodiment, the so-computed time-space function f(t) is only an initial proposal, which a user may accept as is, or modify at will. Thus, the preferred embodiment enables a user to label additional panoramic images manually, or to change existing labels obtained through the first processing step.

Figure 4:
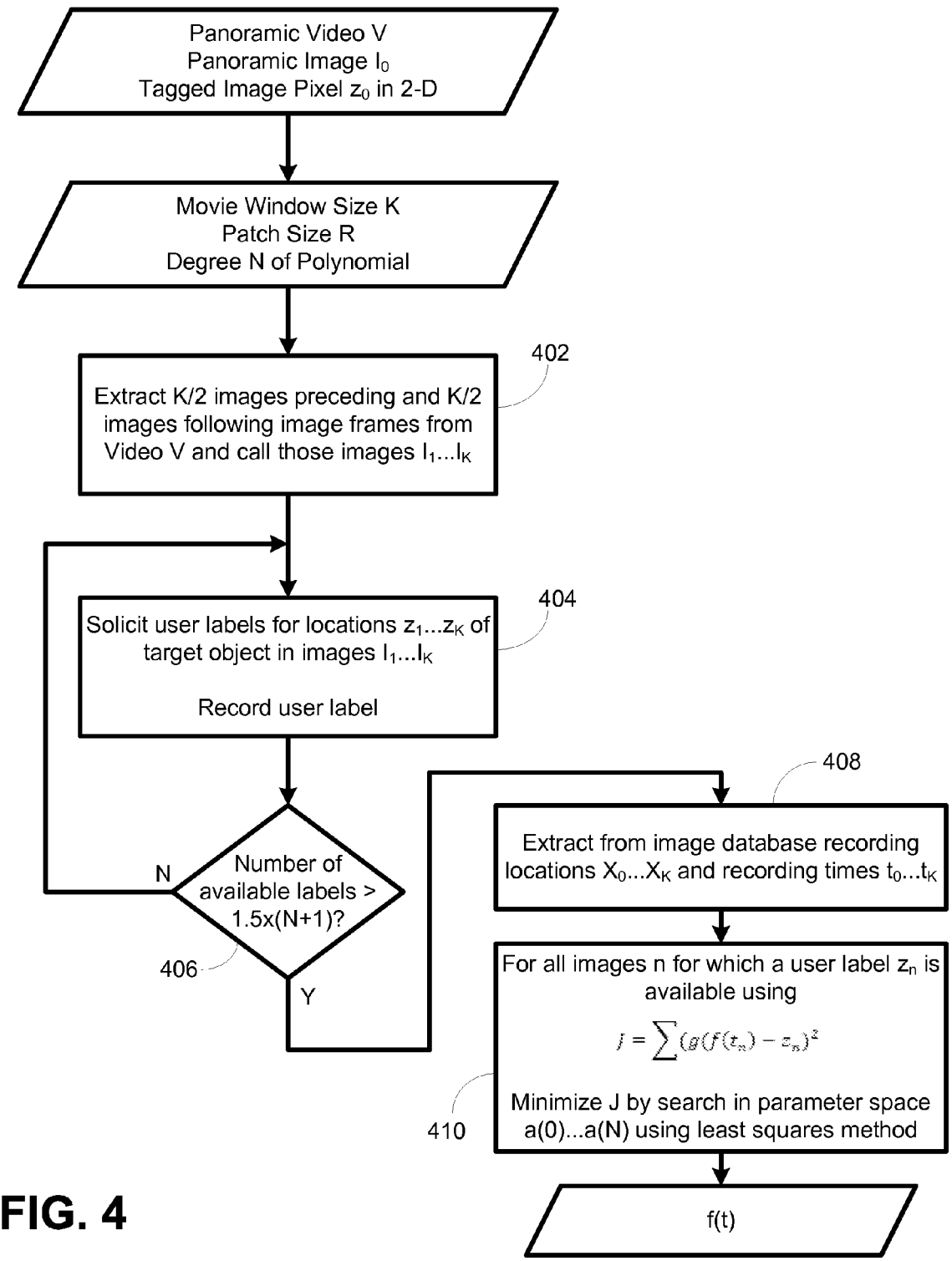
FIG. 4 is a flowchart of the algorithm for defining the time-space function of a tag from user input according to the present invention.

The preferred embodiment procedure for manual labeling is depicted in FIG. 4. In this procedure as shown in step 402, a user interface displays K+1 contiguous panoramic images from the panoramic video stream, which are selected as follows: the K/2 images preceding the already labeled image $I_0$; the labeled image $I_0$ itself, and the K/2 images that follow the labeled image in the video stream.

The user may then use its pointing device to label the location of the target object in any subset of these images in step 404. With each so-provided manual label $z_i$ for the i-th image $I_i$, two additional constraints are added to the constraint base. As indicated in step 406 when the number of labeled images exceeds the value of N+1 by at least a factor of 1.5, the resulting least squares problem is usually well-defined. The preferred invention uses standard function fitting methods to recover the parameters of the time-space function f(t) as shown in steps 408 and 410 where the recording locations $X_0 \ldots X_K$ and the recording times $t_0 \ldots t_K$ are extracted from the image database and the coefficients a(n) of the function f(t) are identified using the formula:

$$J = \sum_n (g(f(t*n) - z*n))^2$$

J is minimized by searching in the parameter space a(0) . . . a(N) using least squares.

In a final processing step for the definition of a tag, the preferred embodiment enables the user to select an action associated with this tag. This action will be selected from a menu provided to the user, or by specifying a textual command. Additionally, the preferred embodiment will accept a textual annotation of the tag. This textual annotation will be used when visualizing a tag within a panoramic video stream, and it will also serve as a reference to a tag. Once these selections have been made, the definition of the tag is complete, and the tag can be displayed when viewing panoramic video during a virtual tour of the environment. When viewing the video, thus, users can select the tag and execute associated action as disclosed above.

In the preferred embodiment, tags also serve as outside references to the panoramic images. The embodiment catalogs the user-provided textual annotation of all tags, and use common techniques for accessing the resulting catalog, familiar to those skilled in the art. In particular, the preferred embodiment will rely on common keyword-based search methods for textual databases, to make textual annotations of all tags searchable. In this way, the textual annotation of a tag becomes an alternative index into the panoramic video.

The above disclosure describes the preferred embodiment only. Those familiar with the skill in the art recognize that there are many different embodiments of the said invention. Hitherto we discuss some of the alternative embodiments. This discussion is provided for purposes of illustration only, and thus does not limit the present invention.

In the preferred embodiment, images are acquired using a panoramic imaging sensor 101. Those skilled in the art recognize that there exists a plurality of panoramic imaging sensors. For example, panoramic images may be acquired by a camera with a parabolic mirror, or by a camera rig with multiple cameras whose fields of view partially overlap, and which uses computer software to combine same into panoramic images. Mechanisms and processes for acquiring panoramic video are disclosed in U.S. Pat. Nos. 5,987,164; 6,788,333 and 6,118,474. This list of panoramic image acquisition methods is illustrative and shall not limit the scope of the present invention.

In the preferred embodiment, the positioning system 102 is a satellite GPS (global positioning system) with an integrated IMU (inertial measurement unit). Those skilled in the art realize that there exists a plurality of determining the location and orientation of an imaging sensor relative to a fixed coordinate system, and the use of GPS and IMU shall be considered illustrative examples, which do not limit the scope of the present invention. For example, positions may be determined using a laser-based ranging sensor, or any other method for determining positions within a coordinate frame. The invention disclosed herein is not restricted to specific methods or mechanisms for determining the location of the imaging sensor.

In the preferred embodiment, images are tagged by moving a cursor to a desired image region, followed by a mouse click. As should be obvious, there exist many different mechanisms through which a user can label a location in an image, of which the use of a cursor and a computer mouse are examples. The labeling may place through keyboards, pens, body articulation, or any other means to communicate information to a computer. There exists many different methods for labeling images, and the present list is only an illustration which does not limited the scope of the present invention.

In the preferred embodiment, the time-space curve f(t) is a polynomial of degree N. There exist many different methods for representing and fitting time-space curves. The function f(t) may not have to be a polynomial; instead, any mathematical representation of a curve is equally applicable. The criterion for curve fitting may not have to be least squares. Any other norm or distance function may be used, such as the L1 norm, or the Tchebycheff norm. The method for curve fitting need not to be conjugate gradient; instead, there exists a wealth of alternative methods. Those skilled in the art realize that there exists a plurality of curve fitting techniques that can be brought to bear according to the present invention.

In the literature on function fitting, it is common to apply penalty terms for regularization, so that overfitting can be avoided. For example, if f(t) is represented polynomials of large degree N, some embodiments may a penalty term to the overall function fit that grows with N. In this way, the value of N needs not to be preselected by a user, but instead can be chosen automatically. Those skilled in the art recognize that complexity penalty terms are common in the literature of statistical estimation, under names such as "Occam's razor" or "Bayesian information criterion (BIC)". Many textbook on function fitting discuss methods for regularization. For example, see Hastie, T., Tibshirani, R., and Friedman, J. H., "Elements of Statistical Learning: Prediction, Inference and Data Mining," Springer, 2001.

The preferred embodiment relies on location labels for panoramic images. In some embodiments, the orientations of panoramic images may also vary over time, and hence their orientations carry relevant information. For example, when acquiring panoramic video with a moving vehicle, the orientation of the image acquisition device will vary in all three rotational dimensions. Alternative embodiments may process orientation labels in addition to the position labels. As those skilled in the art recognize, embodiments according to the present invention easily accommodate orientation information, by selecting an appropriate projective function go. They thus, include the use of orientation information in the panoramic video.

The preferred embodiment refers to panoramic video where each frame is labeled by the time and location of acquisition. Clearly, the invention is applicable to video that lacks said information. If no time stamps are available, alternative embodiments may use the frame count in the video stream in lieu of a time stamp. For tagging non-moving objects, alternative embodiments might simply not use time-variant representations, which is equivalent to setting N to 0, in which case the value of time stamp has no effect on the rendering and use of a tag.

Further, the preferred embodiment assumes that location information is provided with the panoramic video. In some cases, location information may be unavailable. Alternate embodiments may simply attach a default location to each panoramic image or, alternatively, use "structure from motion" or "visual odometry" techniques to estimate the ego-motion of the image acquisition device. Methods for visual odometry are described in Broida, T. J., Chandrashekhar. S., and Chellappa, R., "Recursive 3-D Motion Estimation from a Monocular Image Sequence," IEEE Transactions on Aerospace and Electronic Systems: 26 (4), pp 639-656, 1990; and for panoramic images in Corke, P. I. and Strelow, D. and Singh, S., "Omnidirectional visual odometry for a planetary rover," Proceedings of the International Conference on Intelligent Robotics and Systems (IROS), 2004. Those skilled in the art realize that there exist many different techniques to estimate position labels for video streams. All such techniques are applicable to the present invention, as the spirit of said invention does not relate to a specific source of location information for the panoramic video.

In the preferred embodiment, the time-space curve as defined over 3-D space. In some embodiments using panoramic video, it may be impossible to recover actual 3-D space variables. Thus, in some embodiments of his invention, the time-space curve may be defined in image coordinates, whereby the domain of the function f(t) is time, and its range is the space of all image coordinates.

In the preferred embodiment, the time-space function f maps a parameter t into a three-dimensional coordinate space. In some embodiments, it will be essential to also determine the orientation of a graphical tag. In such applications, f may map to a six-dimensional space, comprising the x-y-z-location of the tag for any given value of t, and the orientation of the tag expressed in Euler angles. The resulting time-space function may then be of dimension up to 7-D, with one time parameter, three coordinates, and up to three orientation parameters.

Tags may also possess properties that change over time. For example, a tag may be displayed with variable color, or have attached a sound signature. In such situations, the output of the function f can be much higher dimensional. The present invention is not restricted to a specific form of the function f, but in spirit includes a multitude of data that can be associated with a tag.

The preferred embodiment defines tags in the context of panoramic video. Panoramic video facilitates the tracking of real-world objects even when changing the orientation of the camera. However, the present invention is applicable to all forms of video, not just panoramic video. For example, it is applicable to conventional handheld video recording devices, and to video acquired by stationary cameras as used, for example, for building surveillance. The discussion of the nature of the specific recording device and the associated video format is illustrative, and shall in no way restrict the scope of the invention disclosed herein.

In some embodiments of this invention, a viewer may only show a subset of a panoramic image at any given point in time. For example, the Movie Map system (see: Lippman, A., "Movie maps: An application of the optical videodisc to computer graphics," Computer Graphics (SIGGRAPH'80), vol. 14 (3), July 1980, 32-43) recorded four different images in four different directions, but provided only one of those images to the user at any point in time. Alternative system discussed in U.S. Pat. Nos. 6,968,973 and 7,096,428 enable users to view sub-regions of panoramic images while assuming control over the selection of said sub-regions through panning, tilting, and zooming. In alternative embodiments, time-space tags are defined and visualized for such alternative viewers. Embodiments of the present invention apply to any type and shape of visualization of panoramic video, including techniques that project video on 3-D shape models and that, at any given point in time, display only a subset of a panoramic image.

In the preferred embodiment, the definition of a time-space function is not possible from a single image label. The reason for this deficiency was discussed: even the most simple, time-invariant time-space function requires the definition of at least three parameters, whereas an image label only provides two constraints. In alternative embodiments, other information may be used to supplement the image label data. For example, an alternative embodiment may assume that the object selected by a user is located at a fixed, known distance to the image acquisition device. Such an assumption may make sense when labeling buildings in visual tours. As a result, a single image label may be sufficient to determine the function f(t). In alternative embodiments, the distance between the image acquisition device and the object of interest might be known through a 3-D model of the environment. In a third family of embodiments, a user may simply select this distance manually, when labeling an image. In all of these embodiments, a reduced number of image labels may be required to determine the function f(t). The present invention includes embodiments in which other information is used to restrict the shape of the time-space function. The source of such information may be manifold; the present discussion is only an illustration. Those skilled in the art will realize there exists a plurality of mechanisms for acquiring such additional information, constraining the function f(t).

The preferred embodiment uses SIFT features and optical flow techniques for tracking local image patches in video. Those skilled in the art realize that there exists a huge body of literature on tacking image patches. Alternative embodiments may rely on particle filters for tracking, as described in more detail in Isard, M. and Blake, A., "Condensation: conditional density propagation for visual tracking," International Journal of Computer Vision: 29(1): 5-28; 1998. Alternative panoramic tracking techniques are described in U.S. Pat. No. 6,924,832. The present invention can be combined with arbitrary methods for tracking patches in images, and the present discussion is only an illustration that does not limit the invention disclosed herein.

The preferred embodiment labels a contiguous video sequence of K images. In alternative embodiments, other images may be chosen for labeling, based on different criteria, For example, the viewer may select images whose acquisition locations meet a threshold criterion. For example, it may only chose images whose acquisition locations are a certain distance away from each other, so as to diversify the viewing angles of the target object. Those skilled in the art realize that there exists a plurality of selection criteria of images for labeling.

In the preferred embodiment, the image labeling procedure is based on three steps: an initial manual labeling step in which only a single image is labeled; followed by an automatic procedure for labeling time-adjacent images; followed by an additional manual step. In alternative embodiments, only one of those steps is used. Alternatively, both steps may be interleaved and executed in arbitrary order, and both steps may be invoked a variable number of times. For example, some embodiments will enable a user to label a small number of images manually, then use image tracking techniques to derive further labels, followed by a manual adjustment phase of the so-found labels. The preferred embodiment, thus, provides for a user interface that enables the user to make these choices at will, and to interleave different methods of image labeling.

The preferred embodiment displays tags at specific image locations. In some embodiments, it may be advantageous to visualize the constraints within an image that result from a partial definition of a tag during the tag labeling process For example, for N=0 a single labeled image $I_0$ will constrain the location of the object in all other images to a one-dimensional curve. The preferred embodiments will visualize such curves in adjacent panoramic images, to aid the user in labeling those images. Alternative embodiments will display the manifold in said images, so as to assist the user in the definition of a tag. This example is only an illustration of ways in which constraints can be visualized so as to assist a user in the specification of tags.

In related embodiments, the user will be provided with a mechanism to revise labels. For example, she might erase an existing image label, or drag-and-drop an existing image label to a different location in the image. Those skilled in the art realize that there exists a rich repertoire of image labeling techniques, and the present discussion is only exemplary, not restrictive for the invention disclosed herein.

In the preferred embodiment, a user-selection of a tag results in the execution of the action associated with said tag. Such action may include, but is not limited to: The reference of a website; the initiation of a purchasing transaction; the dispatch of an electronic message; the display of a 3-D model in an interactive viewer; the acoustic display of sound; the display of an image or a video; the spawning of a computer program; or the execution of a procedure that affect that state of the viewer or the computer 100. This list is illustrative, and the invention is in no way limited to specific types of actions that may result in a user-selection of a tag.

In the preferred embodiment, the action associated with a tag is selected from a menu. Those skilled in the art realize that there exist many different mechanisms to specify a computer action. For example, the action may be specified through a text window, or from a list of graphical icons. These examples are only illustrations of the many different ways in which a computer action can be specified by a user. The present invention is in no way restricted to these examples, and instead applies to any method of specifying a computer action for an image tag.

Some embodiments may display user-defined information stored on the computer system 100. For the latter, a user might have to upload information to the computer system 100 for the action specification to be complete. For example, a user might want to attach a photograph or a video to a specific tag. The resulting embodiments will enable the user to upload said information. Alternatively, some embodiments will enable a user to attach text to a tag. Such tag may explain the nature of a tag, and it may be used to access tagged images. For example, a URL of the tagged image along with the text may be made accessible to other online information sources, such as search engines. Those skilled in the art realize that there exist many mechanisms for attaching information to a tag, and sharing this information with other users and Internet services.

In the preferred embodiment, tags are annotated textually. These annotations are used in the display of tags, and they also may be used as index into the video database. In alternative embodiments, tags are annotated by multimedia information. Some embodiments will provide explicit keyword fields, which are distinct from verbal explanations of the tag, which are distinct from fields in which a tag-defining user may add his identity. Some embodiments will enable the user to annotate tags with images and sounds, which are displayed simultaneously with the associated video frames, or upon the motion of an electronic pointing device to an image location near a tag. As those skilled in the art realize, there exist many different ways of annotating tags with information, and many different types of information that can be displayed with a tag.

In alternative embodiments, a user may attach priority labels to tags. For example, some tags may be of interest to a large group of users, whereas other may only be relevant to a small user group. In such embodiments, tags will only be visualized according to their priority labels. Those skilled in the art realize that there exist many mechanisms for attaching priorities to tags.

In the preferred embodiments, tags are displayed unselectively. In alternative embodiments, the viewer may chose to display tags given certain criteria, such as a maximum distance criterion to the viewing position. In some embodiments, the user may also specify conditions under which a tag is displayed, such as a time bracket, or a proximity constraint. Clearly, those skilled in the art realize that there exist many different criteria under which a tag may be displayed. The present invention is not restricted to a specific criteria, but in spirit includes a multitude of selective visualization techniques for the display of tags.

Embodiments of the invention may be implemented within a client-server architecture. The user interfaces for viewing tagged panoramic images and video, and for creating tags, may be provided through a client application. When the client is embedded in a Web browser, user-defined tags may be communicated to a server for storage in a database. The tag may then be communicated to other clients, where other users may be able to view the tag and invoke the corresponding action. The present invention is not restricted to a specific architecture, viewer, or mechanism for transporting information between different data processing systems.

In some embodiments, tags will be given unique URLs. Those URLs will enable remote viewers to directly access the visualization of tags with the associated panoramic images. When textual tag annotating are made available to Internet search engines, the corresponding URLs will make it possible to directly access a panoramic image from the Web site displaying the search results. The present invention is independent in spirit to the specific choice of method for organizing tags, so as long as the tag or its associated information is used as an alternative index into a panoramic video database.

While the invention has been particularly shown and described with respect to preferred embodiments thereof, it will be understood by those skilled in the art that changes in form and details may be made therein without departing from the scope and spirit of the invention.

The invention claimed is:

1. An image acquisition system comprising:
   a camera for acquiring panoramic images;
   a positioning system;
   a computer system, where the computer system is configured by a first server application and a second server application; and
   an image database;
   where the computer system is configured by the first server application to:
      receive a plurality of panoramic images captured by the camera;
      receive a plurality of locations captured by the positioning system corresponding to positions where the plurality of panoramic images are captured;
      receive a plurality of time stamps corresponding to times when the plurality of panoramic images are captured;
      generate a plurality of annotated panoramic images by associating the plurality of panoramic images with the corresponding plurality of locations and corresponding plurality of time stamps; and
      upload the plurality of annotated panoramic images to the image database; and
   where the computer system is configured by the second server application to:
      receive a user selection of a 2-D tag location in a first panoramic image found in the image database;
      calculate a time-space function defining the 2-D tag location in the 3-D physical world, where the time-space function maps an annotated time stamp of the first panoramic image to 3-D coordinates;
      calculate an updated location using the time-space function; and
      select a second panoramic image from the image database annotated with the updated location.

2. The image acquisition system of claim 1, wherein the time-space function is evaluated by minimizing the following expression:

$$f(t) = \sum_{0}^{N} a(n)t^n$$

where $f(t)$ is the time-space function, t is time, a(n) is a three valued coefficient vector that determines the shape of the time-space function, and n is the integer degree of the polynomial.

3. The image acquisition system of claim 1, wherein the time-space function further comprises a 4-D curve in polynomial form.

4. The image acquisition system of claim 1, wherein the positioning system further comprises a global positioning system and an inertial measurement unit.

5. The image acquisition system of claim 1, wherein the positioning system further comprises a laser range finder.

6. The image acquisition system of claim 1, wherein the 3-D coordinates further comprise positions in Cartesian space.

7. The image acquisition system of claim 1, wherein the tag further comprises a predefined time-space curve, an action executable upon selection by the user, a textual annotation explaining the meaning of the tag, and a pointer to associated panoramic images.

8. The image acquisition system of claim 1, wherein the computer system further comprises a user computer system configured to execute a client application embedded in a web browser application.

9. The image acquisition system of claim 1, wherein the computer system further comprises a first computer to utilize the first server application and a second computer to utilize the second server application.

* * * * *